Figure 1:
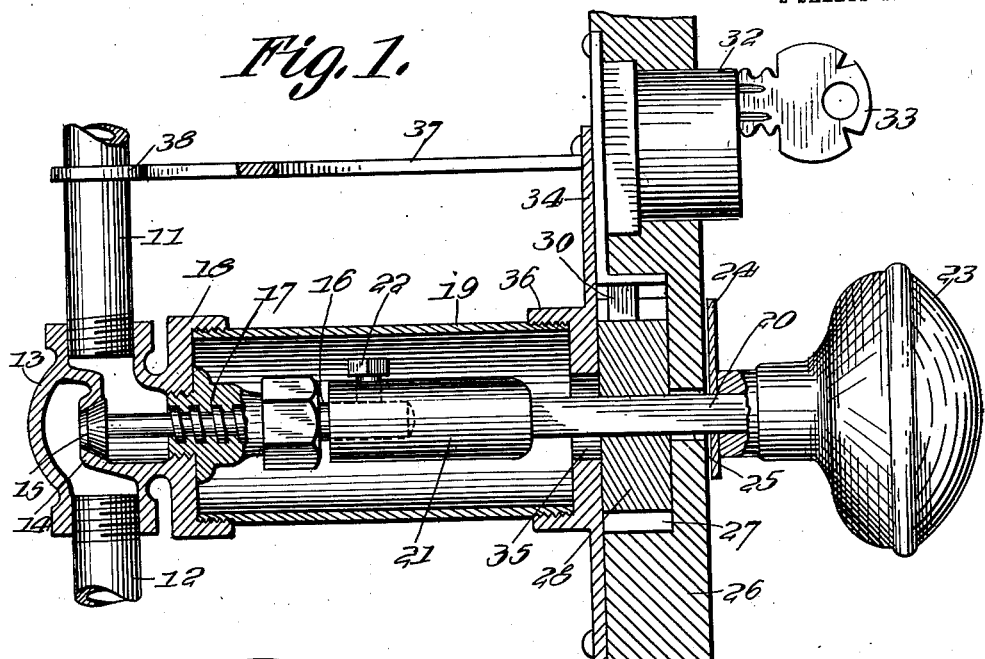

G. W. CROSS.
VALVE LOCK.
APPLICATION FILED JULY 14, 1913.

1,082,935. Patented Dec. 30, 1913.
2 SHEETS—SHEET 1.

Witnesses
James R. Pattison
L. E. Barkley

Inventor
George W. Cross,
By Frank S. Ackerman,
Attorney

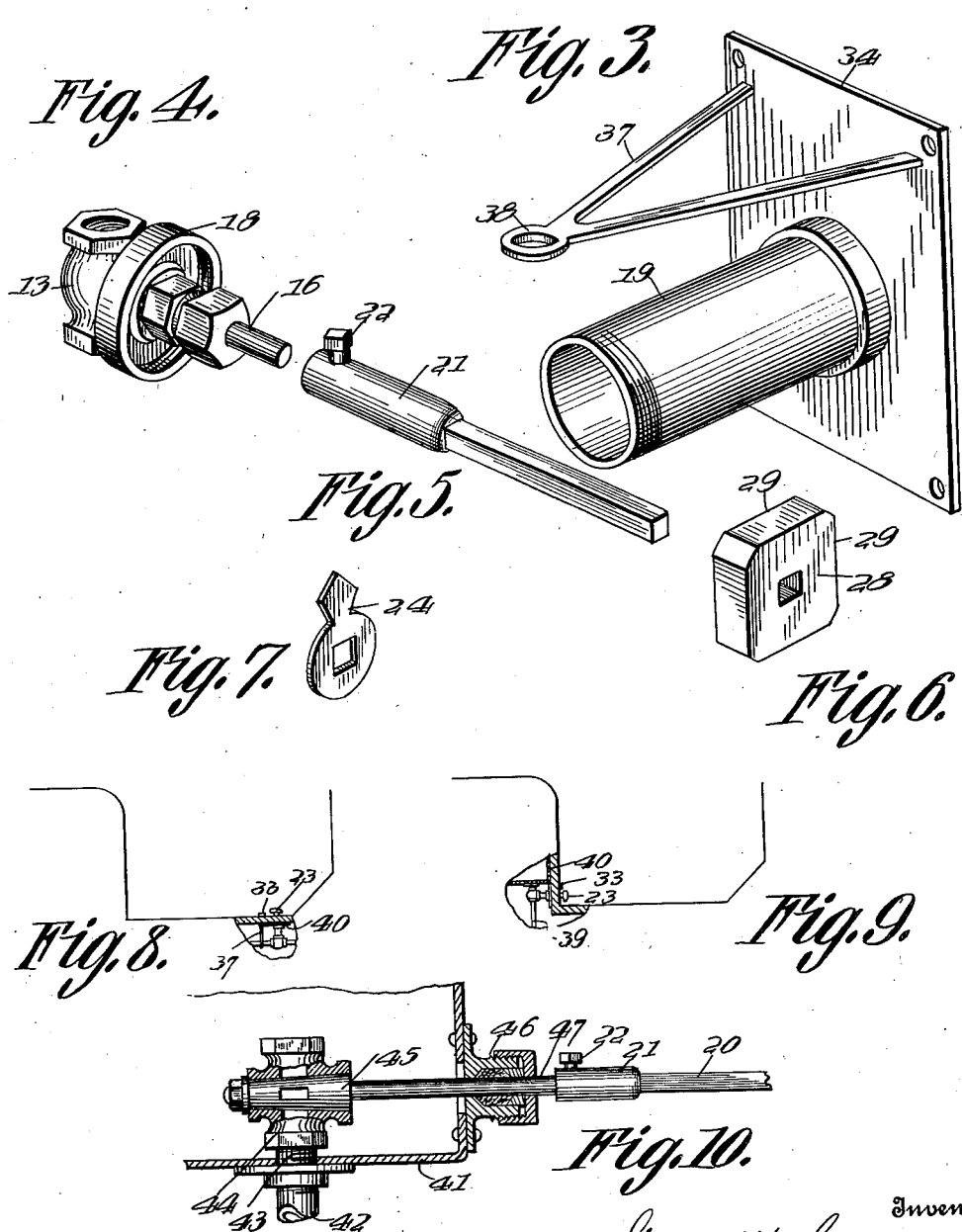

UNITED STATES PATENT OFFICE.

GEORGE W. CROSS, OF FORT SMITH, ARKANSAS.

VALVE-LOCK.

1,082,935.  Specification of Letters Patent.  Patented Dec. 30, 1913.

Application filed July 14, 1913. Serial No. 778,990.

*To all whom it may concern:*

Be it known that I, GEORGE W. CROSS, a citizen of the United States of America, and resident of Fort Smith, in the county of Sebastian and State of Arkansas, have invented certain new and useful Improvements in Valve-Locks, of which the following is a specification.

This invention relates to devices for protecting automobile owners and users against theft or unauthorized use of the automobile through control for the fuel line or the fuel supply, novel means being provided for checking the flow of fuel and for retaining the checking means against manipulation for unchecking the fuel line.

An object of this invention is to provide novel means for holding a valve in closed position or in different positions of adjustment in order that a valve which may be utilized for controlling the flow of fuel from a tank or source of supply to the motor may be so controlled as to interrupt the supply of fuel, novel means being provided for holding a portion of the valve against movement so that the operator or owner of the automobile may lock the parts in the position he desires them to remain.

A still further object of this invention is to provide a valve and a valve stem under the control of a retaining mechanism, means being associated with the mechanism for supporting the fuel line and for preventing distortion or twisting of the said fuel line while the valve is being manipulated, said mechanism being associated with means for retaining the valve operating mechanism in different positions of adjustment and locked or immovable.

A still further object of this invention is to provide a device of the character indicated in which the lock or retaining mechanism engages a member which is capable of assuming different positions with relation to the locking mechanism in order that the valve may be moved a greater or less degree according to the requirements, the said arrangement permitting comparatively minute adjustment and affording lock engaging surfaces while at the same time permitting the comparatively minute adjustment.

A still further object of this invention is to provide mechanism of the character indicated having the advantages above stated associated with a protecting casing for the valve stem and its operating mechanism and parts associated therewith.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 2:
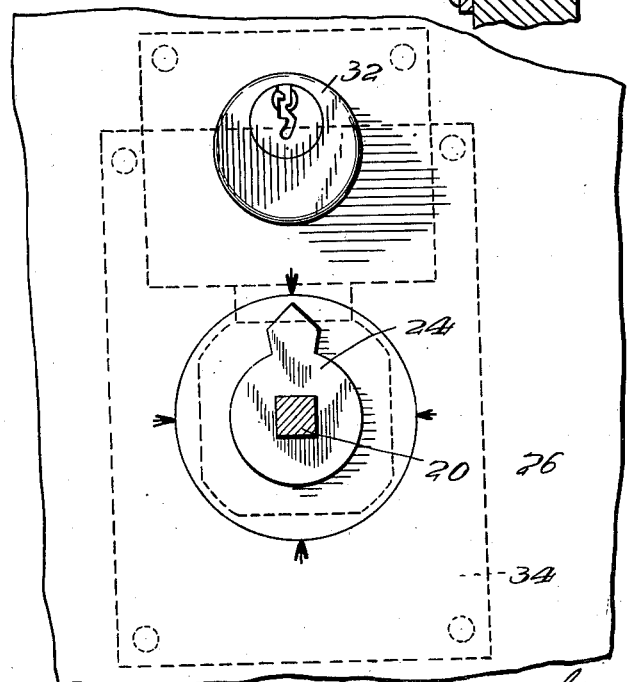

Figure 1 illustrates a sectional view of the controlling and retaining mechanism associated with a fragment of a fuel line, parts of the said mechanism being in elevation; Fig. 2 illustrates a view in elevation of the front of the mechanism shown in Fig. 1, with the handle and key omitted; Fig. 3 illustrates a perspective view of a plate and bracket associated therewith and a casing for the valve stem in assembled relation; Fig. 4 illustrates a perspective view of the valve; Fig. 5 is a perspective view of the spindle; Fig. 6 illustrates a perspective view of a plate; Fig. 7 illustrates a perspective view of the indicator; Fig. 8 illustrates a diagrammatic view with part of the mechanism shown in elevation illustrating one method of carrying the invention into practice; Fig. 9 illustrates a view similar to Fig. 8 showing a modified method of applying the invention in practice; and Fig. 10 illustrates a sectional view of a fragment of a tank or container with a valve associated therewith illustrating another method of practically applying the invention.

In these drawings 11 denotes one section of a fuel line or supply pipe and 12 another section thereof with a valve 13 interposed for establishing communication between the two pipes. The valve 13 here shown is of the globe type, the same having a valve seat 14 for the valve 15, the said valve 15 having a valve stem 16 with threads 17 by which said valve stem is caused to carry the valve 15 toward or away from the seat, in order that the passage of fuel through the said valve may be controlled.

The details of construction of the valve casing are immaterial and will not, therefore, be described more fully, as the foregoing will enable those skilled in the art to understand the construction and operation of the valve, but the valve illustrated in Fig. 1 has an internally threaded flange 18 which is designed for engaging threads of a tubular housing 19 which embraces the valve stem and other portions of the mechanism as will presently appear.

The spindle 20 terminates in a socket 21, in which the valve stem 16 is seated, the said socket having a set screw 22 for binding against the valve stem, so that the spindle 20 when turned will communicate motion to the valve stem in a rotary direction and cause the valve to reciprocate with relation to the valve seat. The outer end of the spindle may be provided with any appropriate hand grasp or handle, the same being here shown as having a knob 23 and the said spindle furthermore carries an indicator or pointer 24 in order that the degree of movement or rotation of the spindle may be registered, and the operator may know to what degree the valve has been moved. The spindle extends through the aperture 25, of a lock casing 26, the said lock casing having a recess 27 for the reception of a plate 28, the edge of which has approximately square edges 29, the number of which may be varied to suit particular requirements. The plate here shown is approximately square in plan, presenting four edges which may be brought into operative relation to the bolt 30 of the lock, the said bolt being a part of a lock of any appropriate type, the lock here shown being of the barrel type and having a cylinder 32 to which a key 33 is fitted for the purpose of operating the bolt, but as the interior construction of the lock is not a part of the present invention, it is not shown nor is it described in detail.

Associated with the casing 26 is an inner face plate 34 provided with an aperture 35 through which the spindle 20 projects and in which it is rotatable, the said plate 34 having an annular flange 36 which is internally threaded for engaging the threads of the housing 19 and when the parts are in the assembled position shown in Fig. 1, the housing guards the valve stem against access to or manipulation of the same. As a means for preventing the turning, distortion or displacement of the fuel line when the valve is manipulated, a bracket 37 extends from the plate 34 and said bracket has a loop or eye 38 for receiving the fuel line and retaining it against displacement, as stated. The particular construction of the bracket may be varied, but is here shown as comprising a one-piece metal structure which might be made by stamping the same from sheet metal.

From an inspection of the drawing and from the foregoing description, it will be obvious that the user of a controlling device forming the subject matter of this invention may close the valve to prevent fuel from passing from the container, reservoir or tank to the motor of an automobile, and when the valve is seated, the lock may be manipulated so that the bolt thereof engages the plate 28, thereby preventing rotation of the said plate and consequently holding the spindle against rotation so that the valve cannot be opened until the mechanism is unlocked. It is also obvious that by reason of the fact that the plate 28 has a plurality of edges a minute adjustment of the valve may be secured and that the same may be locked in different positions of adjustment through the method heretofore explained.

In Fig. 8, I have illustrated the invention as applied to the floor of an automobile body where the fuel pipe is extended horizontally which arrangement is a very commonly adopted method of arranging the fuel line.

In Fig. 9, I have illustrated the invention as applied to a vertically disposed fuel line 39 extending from the tank 40, the operating mechanism, that is to say the handle 23 for operating the valve and the key 33 of the lock projecting through the box of the front seat, the fuel tank being applied under the front seat. While I have referred to this invention as being used for a fuel line, it is obvious that it may be employed for a steam line, hot air line, or other fluid for operating a motor or engine and I, therefore, do not wish to be restricted to the use of this invention.

In the modification shown in Fig. 10, the fuel container or receptacle 41 has a discharge pipe 42 which may lead to the motor or other place of use, and the said pipe 42 terminates in a nipple 43 which contains a valve casing 44, said valve casing being in communication with the pipe 42 and having a valve plug 45 therein for controlling the passage of fuel from the interior of the receptacle or tank 41 to the pipe 42. The receptacle 41 may have any appropriate stuffing box 46, through which the valve stem 47 extends, said valve stem being connected to the spindle 20 through the medium of the socket 21 and set screw 22 which has heretofore been described.

I have shown in the drawings the use of the invention as associated with a globe valve and with a turning plug, thereby illustrating the interchangeability and the divers uses to which the invention may be put, and other uses may be suggested to those skilled in the art.

I claim—

In a controlling mechanism for fuel lines, a valve casing, a valve therein, a fuel line connected to the valve casing, said valve casing having an annular flange internally threaded, a threaded valve stem connected to the valve and projecting from the casing, a housing threaded on the annular flange into which the valve stem projects, a lock case having a recess therein, a plate having an angular edge rotatable in the recess, a spindle extending through the lock case, whereby the said valve is operated, a socket on the spindle for receiving the end of the valve stem, means for holding the socket and valve stem in assembled relation, a lock having a bolt adapted to engage the said plate, a face plate on the casing, said face plate having an annular flange to engage the end of the housing remote from the valve, and a bracket anchored on the said plate and having means for receiving and engaging the fuel line.

In testimony whereof, I hereunto affix my signature in the presence of two witnesses.

GEORGE W. CROSS.

Witnesses:
 GEORGE A. KUPER,
 JOS. V. GERRARI.